United States Patent
Ionescu et al.

(10) Patent No.: US 9,348,723 B2
(45) Date of Patent: May 24, 2016

(54) METHOD, SYSTEM, AND COMPUTER PROGRAM PRODUCT

(75) Inventors: Razvan Ionescu, Bucharest (RO); Ionut-Valentin Vicovan, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 152 days.

(21) Appl. No.: 13/977,076

(22) PCT Filed: Jan. 21, 2011

(86) PCT No.: PCT/IB2011/050274
§ 371 (c)(1),
(2), (4) Date: Jun. 28, 2013

(87) PCT Pub. No.: WO2012/098434
PCT Pub. Date: Jul. 26, 2012

(65) Prior Publication Data
US 2013/0305099 A1   Nov. 14, 2013

(51) Int. Cl.
*G06F 11/34* (2006.01)
*G06F 11/36* (2006.01)

(52) U.S. Cl.
CPC .......... *G06F 11/348* (2013.01); *G06F 11/3636* (2013.01)

(58) Field of Classification Search
CPC ..... G06F 11/3636; G06F 11/348; G06F 9/44; G06F 9/328; G06F 9/30094; G06F 9/268; G06F 9/30145; H04L 67/34
See application file for complete search history.

(56) References Cited

U.S. PATENT DOCUMENTS

| | | | | |
|---|---|---|---|---|
| 5,796,972 | A * | 8/1998 | Johnson et al. | 712/208 |
| 5,884,023 | A * | 3/1999 | Swoboda et al. | 714/30 |
| 6,026,503 | A | 2/2000 | Gutgold et al. | |
| 7,424,646 | B2 * | 9/2008 | Smith | 714/45 |
| 7,490,227 | B1 * | 2/2009 | Bilski et al. | 712/227 |
| 7,594,139 | B2 | 9/2009 | Nellitheertha | |
| 7,987,393 | B2 * | 7/2011 | Sohm et al. | 714/45 |
| 8,468,393 | B2 * | 6/2013 | Horley et al. | 714/45 |
| 2006/0075310 | A1 * | 4/2006 | Tagawa | 714/45 |
| 2007/0006173 | A1 * | 1/2007 | Sohm et al. | 717/131 |

(Continued)

FOREIGN PATENT DOCUMENTS

KR   10-2006-0027874 A   3/2006

OTHER PUBLICATIONS

International Search Report and Written Opinion correlating to PCT/IB2011/050274 dated Oct. 19, 2011.

(Continued)

*Primary Examiner* — Nadeem Iqbal (57) ABSTRACT

A method for retrieving trace data from a target device is proposed. The target device comprises a program memory, a processor, a trace unit, and a trace buffer. The processor is operable to retrieve instructions from the program memory and to execute them. The trace buffer may contain trace data generated by the trace unit in response to the processor retrieving or executing instructions from the program memory. One or more patch instructions are written to the program memory. The processor executes said one or more patch instructions. The target device, in response to the processor executing said one or more patch instructions, performs a data transfer operation for copying the trace data from the trace buffer to a second memory outside the target device.

19 Claims, 5 Drawing Sheets

(56) References Cited

U.S. PATENT DOCUMENTS

2008/0016408 A1\* 1/2008 Abernathy et al. ............. 714/45
2008/0140985 A1 6/2008 Kitamorn et al.
2008/0235538 A1 9/2008 Horley et al.

OTHER PUBLICATIONS

Mayer Albrecht et al: "Boosting Debugging Support for Complex Systems on Chip", IEEE Computer Society, Apr. 2007, pp. 76-81.

\* cited by examiner

METHOD, SYSTEM, AND COMPUTER PROGRAM PRODUCT

FIELD OF THE INVENTION

This invention relates to a method, a system, and a computer program product as described in the accompanying claims.

BACKGROUND OF THE INVENTION

Modern digital devices often include a tracing tool for collecting trace data while the device is being operated. The trace data may contain, for example, information about events occurring during operation of the device, information about states of the device assumed during operation of the device, information about states of peripheral devices, information about requests received by the digital device, and any other kind of information that may be useful for analysing the digital system and its operation. For example, a digital device may comprise a self-diagnosis tool for analysing the trace data, e.g. in response to a detected error or failure. Furthermore, a user or a developer may analyse the trace data, for example, after a failure of the digital device or in view of optimizing its performance. The trace data may also be referred to as, for example, debugging data, system log data, system history, event history, or simply trace.

The digital device typically generates the trace data at run time and collects it in a trace buffer. In other words, the trace data may be successively accumulated in the trace buffer during operation of the digital device. The trace buffer may be provided by any kind of suitable digital data storage device, for example, a flash memory, or a volatile or non-volatile random access memory (RAM).

In a typical scenario, a processor of the digital device has entered a stop mode after an operating failure, e.g. due to a software bug. A user may wish to analyse the trace accumulated in the trace buffer. The trace data therefore needs to be read from the trace buffer. The digital device may be operable to read out the trace data from the trace buffer. However, this may require resetting the digital device to an initial state, then restarting the processor. This may present a risk of overwriting at least part of the original trace data accumulated in the trace buffer prior to restarting the processor.

U.S. Pat. No. 7,594,139 B2 (Nellitheertha) describes a system and program storage device for extracting data of a buffer after a failure of an operating system. The method involves registering an application prior to the failure and rebooting the system.

Many digital devices comprise a debugging interface for enabling a host device to read data from and write data to the digital device via the debugging interface while the processor of the digital device may be in a stop state. A widely used debugging method is based on the standard test access port and boundary-scan architecture developed by the joint test action group (JTAG) and is generally known as JTAG. Unfortunately, JTAG can have a data rate (number of transferred bits per second) that may be considerably lower than compared to methods in which the digital device itself reads out the trace buffer. Depending on the size of the trace collected in the trace buffer (in many cases, more than 100 megabytes), this can be a significant drawback.

SUMMARY OF THE INVENTION

The present invention provides a method, a system, and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
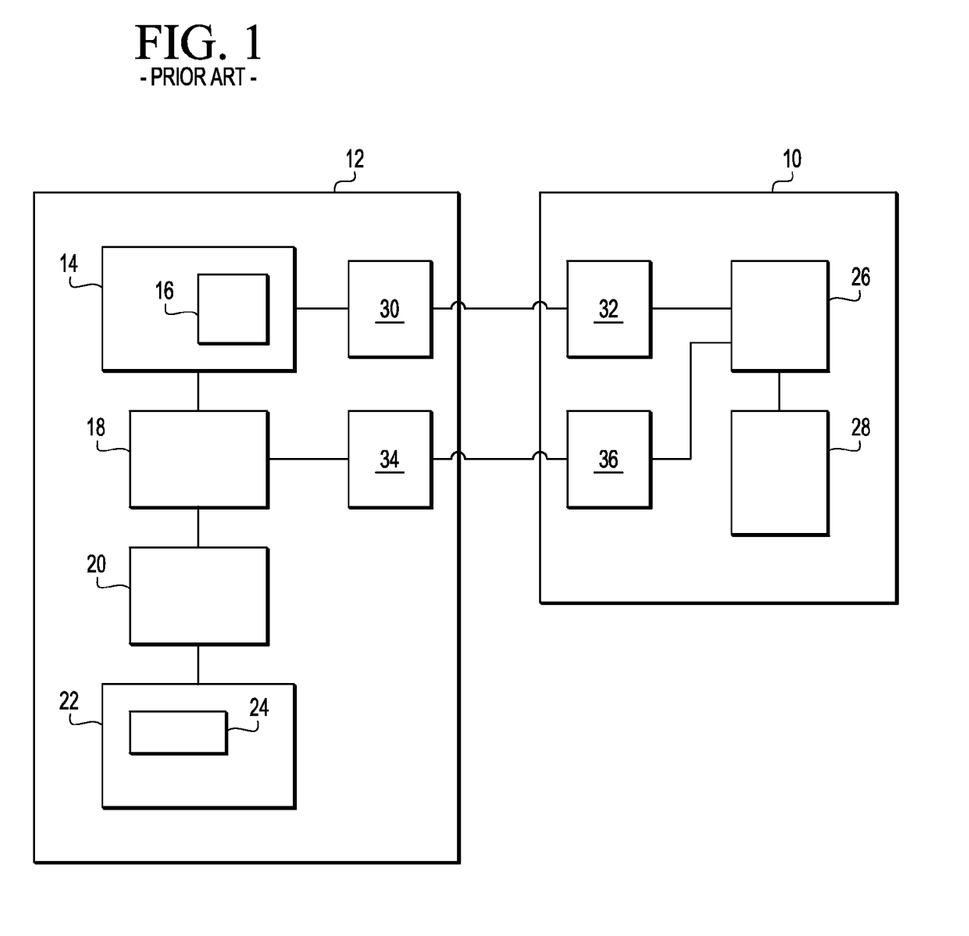
FIG. 1 schematically shows an example of an embodiment of a system comprising a host device and a target device.

FIG. 1 shows a host device 10 and a target device 12. The host device 10 may be connected to the target device 12 for the purpose of retrieving trace data 24 from the target device 12. The target device 12 may, for example, be an embedded system and, in particular, an embedded system on a single chip (system on chip), for example, a microcontroller.

In the present example, the target device 12 comprises a program memory 14, a processor 18, a trace unit 20, and a trace buffer 22. The program memory 14 may contain executable instructions 16 which have been stored therein. The executable instructions 16 may, for example, comprise instructions for controlling the processor 18 to generate an output signal (not shown) in response to an input signal (not shown), for example, in view of automotive or telecommunication applications. The executable instructions 16 may also comprise e.g. an operating system or one or more applications, e.g. one or more applications to be launched according to an input signal (not shown) or according to a signal generated internally by the target device 12. The instructions 16 may also be referred to collectively as a program or as program code.

In the example, the host device 10 comprises a processor 26 and a memory 28. The memory 28 may comprise, for example, a random access memory, a hard disk, a flash memory, or any combination thereof. The host device 10 may, for example, be a personal computer (PC).

The processor 18 may be arranged to retrieve instructions 16 from the program memory 14 and to execute them. The trace unit 20 may be arranged to generate trace data, e.g. in response to the processor 18 retrieving instructions from the program memory 14, or in response to the processor 18 executing instructions retrieved from the program memory 14. For example, the trace unit 20 may be arranged to write a new entry to the trace buffer 22 in response to the processor 18 retrieving e.g. a subroutine call or a jump instruction from e.g. the program memory 14. The trace buffer 22 may contain e.g. accumulated trace data 24 which may have been written to the trace buffer 22 by the trace unit 20 in the course of operating the target device 12.

The target device 12 may further comprise e.g. a first interface 30 and a second interface 34. The host device 10 may further comprise e.g. a first interface 32 and a second interface 36. In the configuration shown, the first interface 32 and the second interface 36 of the host device 10 may be coupled to the first interface 30 and the second interface 34 of the target device 12, respectively. The first interface 30 of the target device 12 and the first interface 32 of the host device may form together a debugging interface 30, 32. The processor 26 of the host device 10 may be operable to control the debugging interface 30, 32 to read data from or write data to the target device 12. For example, the first interface 30 of the target device 12 may be a JTAG interface. The debugging interface 30, 32 may, in particular, be operable to read data from and write data to the target device 12 using scan chains on the target device 12. For example, the program memory 14 may comprise a set of memory cells such as flip-flops or registers, and one or more scan chains. Each of these scan chains may comprise for example a subset of memory cells of the program memory 14. Similarly, the target device 12 may comprise one or more scan chains for accessing e.g. the trace buffer 22 via the debugging interface 30, 32. The debugging interface 30, 32 may enable the host device 10 to access data on the target device 12 without operating the processor 18. In other words, the debugging interface 30, 32 may allow a transfer of data according to the master slave principle—the host device 10 (master) controlling the target device 12 (slave) via the debugging interface 30, 32. As pointed out above, such a data transfer can be relatively slow.

The second interface 34 of the target device 12 and the second interface 36 of the host device 10 may provide together a second data transfer interface 34, 36 for transferring data between the target device 12 and the host device 10. The second data transfer interface 34, 36 may for example enable the processors 18 and 26 of, respectively, the target device 12 and the host device 10 to communicate with each other and to transfer data, for example, from the trace buffer 22 to the memory 28. Each of the second interface 34 and the second interface 36 may, for example, comprise a high-speed port. The second data transfer interface 34, 36 may, for example, be implemented using one of the following techniques: High Speed Simultaneous Transfer (HSST), SmartDSP Host Exchange Asynchronous Transfer (HEAT), RapidIO, or Ethernet.

According to one example, the trace 24 residing in the trace buffer 22 can be transferred to the host device 10 via the second data transfer interface 34, 36, e.g. as follows: processor 26 of the host device 10 may send a trace transfer request via interface 34, 36 to the processor 18 of the target device 12; the processor 18 may respond to receiving the trace transfer request, retrieve the trace 24 from the buffer 22, and send the trace 24 to the host device 10 via interfaces 34 and 36 in accordance with a predefined communication protocol, for example, Ethernet; the processor 26 of the host device 10 may store the received trace 24 in the memory 28. Alternatively, the retrieved trace 24 may be stored in any other suitable memory outside the target 12. The second data transfer interface 34, 36 may enable a fast data transfer but may require the processor 18 of the target device 12 to be running. In other words, a fast data transfer via the second interface 34, 36 may be impossible when the processor 18 is in a stop state.

Figure 2:
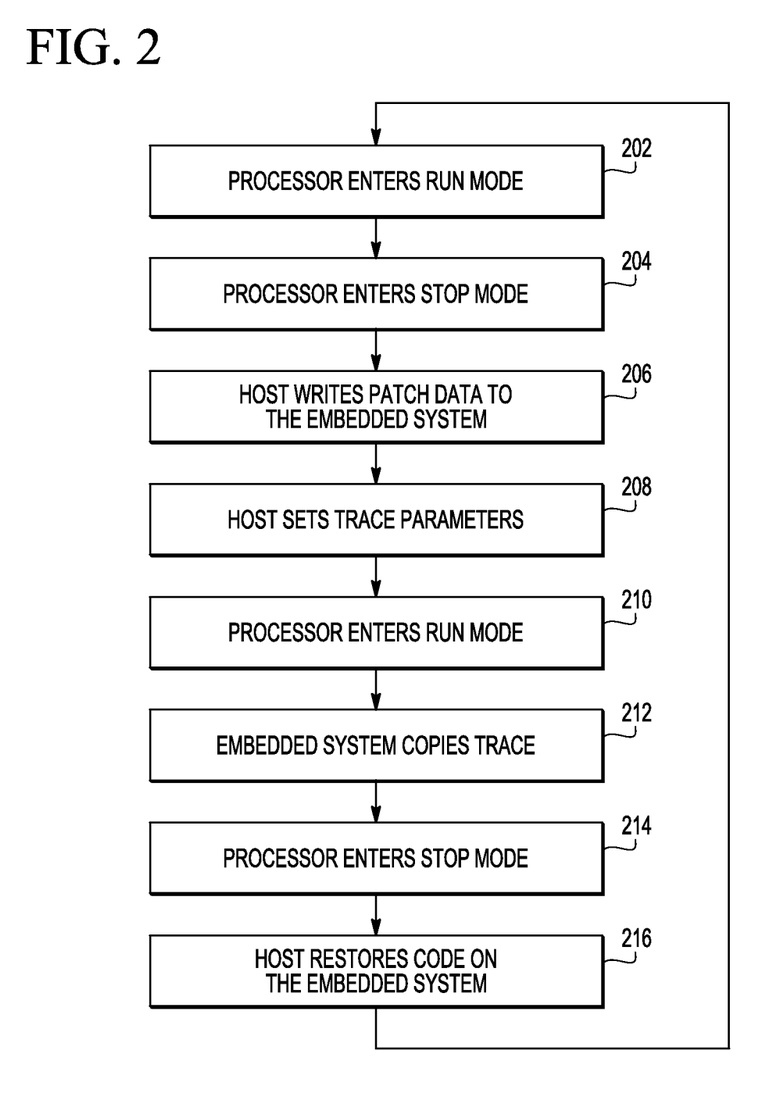
FIG. 2 schematically shows an example of an embodiment of a method of retrieving a trace from a target device.

Referring now, in addition, to FIG. 2, a flow chart of an example of a method of retrieving trace data 24 from the target device 12 shown in FIG. 1 is shown. The method may notably comprise writing (step 206) one or more patch instructions to the program memory 14, the patch instructions comprising at least a first patch instruction; operating the processor 18 to execute said one or more patch instructions (step 210); and the target device 12 performing a data transfer operation (step 212) for copying the trace data 24 from the trace buffer 22 to a second memory 28 outside the target device 12, in response to the processor 18 executing said one or more patch instructions. The processor 18 may have entered a stop mode (step 204) prior to said writing (step 206). The debugging interface 30, 32 may be used to read data from and write data to the target device 12 while the processor is in the stop mode. In contrast, the second data transfer interface 34, 36 may be used for the data transfer operation in step 212. Thus a faster and more robust method than JTAG may be provided for retrieving the trace 24 from the target 10.

In the example shown, the method may begin with a step 202 in which the processor 18 enters a run mode, for example, in response to switching on the target device 12. At this stage, the target device 12 may be disconnected from the target device 10. A run mode is a mode in which the processor 18 automatically retrieves an instruction from the program memory 14, executes the instruction, and fetches the next instruction from the program memory 14. If an instruction is a jump or a call of a subroutine, the processor, instead of fetching the next instruction from the program memory 14, may fetch an instruction indicated by the jump or by the subroutine call, respectively.

In subsequent step 204, the processor may enter a stop mode, for example, due to a stop instruction retrieved from the program memory 14 or due to a failure, for example, a memory overflow. A stop mode is a mode in which a processor does not execute any further instructions. In subsequent step 206, the host device 10 may be used to write one or more patch instructions to the program memory 14, e.g. via the debugging interface 30, 32. The host device 10 may generate the patch instructions and write them to selected addresses in the program memory 14, as will be explained further with reference to FIGS. 3 and 4. The patch instructions may be designed such that when the processor 18 is operated to execute at least the patch instructions, the target device 12 will perform a data transfer operation for copying the trace data 24 from the trace buffer 22 to the memory 28.

In subsequent step 208, the host device 10 may set the trace unit 20 into a trace event request mode and to set a trace event request (TER) address according to a trace buffer address indicated by a trace write pointer (TWP) 620, for example. The trace event request mode will be further described in reference to FIGS. 6 and 7. Depending on the particular architecture, the trace unit 20 may be configured via the debugging interface 30, 32 or via an additional interface associated with the trace unit 20. The trace event request address may be set according to the indicated trace buffer address, so as to ensure that the subsequent steps can be performed as described below.

In subsequent step 210, the processor 18 may again be set into run mode or, alternatively, into a signal step mode. A single step mode is essentially the same as a run mode, the difference being that in the single step mode, the processor will execute only one instruction and then return to stop mode. For the sake of simplicity and clarity, the alternative of operating the processor 18 in a single step mode will not be described any further. However, it should be kept in mind that depending on details of its implementation, after the code on the target has been patched, the processor may only need to retrieve a first patch instruction, or it may need to retrieve and execute one or more instructions. Clearly, if the processor needs to retrieve more than one instruction, the processor may be operated in a stepwise manner, by repeatedly setting it into the single step mode. Setting the processor into the run or single step mode (step 210) may cause the processor 18 to retrieve or to execute a triggering instruction. Whether the triggering instruction is retrieved or executed or both may depend on the details of the implementation. The triggering instruction may, for example, be either said first patch instruction or an instruction referenced by the first patch instruction. The triggering instruction may, for example, be a jump to a second instruction or a call of a subroutine. The second instruction or the subroutine may comprise a stop instruction.

The trace unit 20, in response to the processor 18 retrieving or executing the triggering instruction, may advance the trace write pointer by a defined increment. A trace write pointer, further explained in reference to FIGS. 6 and 7, may indicate a current location within the trace buffer 22, e.g. a location of a most recent entry in the trace buffer 22 or a next location in the trace buffer. Stated equivalently, the trace writer pointer may indicate an address of said current location in the trace buffer 22. The defined increment may correspond to the data size of entries to the trace buffer 22. The trace write pointer may thus hit the trace event request address of the trace buffer. The trace unit 20, in response to the trace write pointer hitting the trace event request address, may trigger the data transfer operation. Triggering the data transfer operation may comprise the trace unit 20 generating an interrupt and the processor 18 executing an interrupt service routine in response to the interrupt. The interrupt service routine may comprise instructions for performing the data transfer operation 212, using for example a fast method, e.g. Ethernet.

In subsequent step 212, the target device 12 may perform the data transfer operation triggered in the preceding step 210 for copying the trace data 24 from the trace buffer 22 to a second memory outside the target device 12. The second memory may, for example, be the memory 28 of the host device 10. Alternatively, the second memory may be a memory outside the target device 12 and outside the host device 10. It is noted that the success of the data transfer operation, i.e. whether or not the trace data 24 is indeed copied to the second memory, does not necessarily depend entirely on the configuration of the target device 12 but may also require the host device 10 to be ready for responding to the target device 12 in accordance with a data transfer protocol. If this is ensured, the target device 12 and the host device 10 may interact so as to copy the trace data 24 via the second data transfer interface 34, 36 to memory 28. This may be done using a fast and reliable method, for example, High Speed Simultaneous Transfer (HSST), SmartDSP Host Exchange Asynchronous Transfer (HEAT), RapidIO, or Ethernet. Depending on the implementation, the trace may thus be transferred many times faster and in a more robust way than using JTAG.

In subsequent step 214, the processor may return to the stop mode, for example, in response to retrieving a stop instruction, e.g. the stop instruction mentioned above in reference to step 210.

In subsequent step 216, the host device 10 may restore original instructions in the program memory 14. Original instructions, in this context, are instructions residing in the program memory 14 prior to writing the patch instructions to the program memory 14. Thus, the original code may be restored in the program memory 14. This may be useful, for example, if the same code in the program memory 14 is to be tested in several runs. It is also noted that the above-described step 210 may involve adding at least one new entry to the trace data 24. In some situations, it may be desirable to remove the newly added entries from the trace 24. Both optional steps, namely restoring the original code in the program memory 14 and restoring the original trace data 24 in the trace buffer 22, may be performed using e.g. the debugging interface 30, 32 described above. In both instances, data that may be expected to be overwritten in the program memory 14 or in the trace buffer 22 may first be transferred to the host device 10 via the debugging interface 30, 32 to generate backup copies, e.g. prior to step 206.

Figure 3:
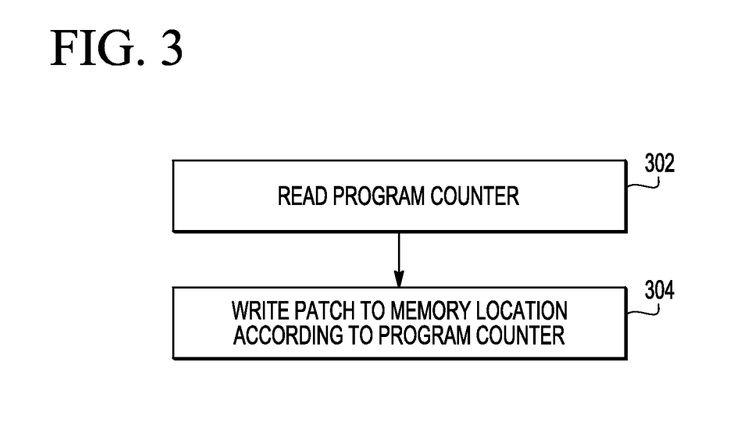
FIG. 3 schematically shows a first example of an embodiment of a method for patching a program residing in the target.
Figure 5:
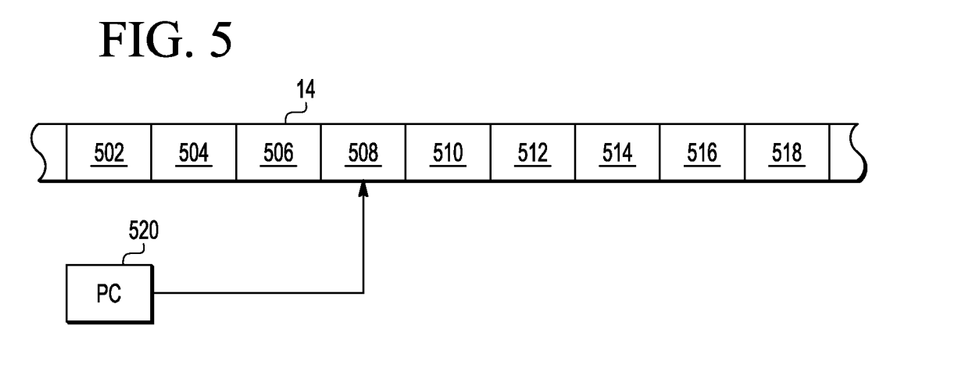
FIG. 5 schematically shows an example of an embodiment of a program memory and a program counter.

Referring now summarily to FIGS. 3 and 5, the target device 12 may have a program counter (PC) 520 for indicating a current location in the program memory 14. The program counter 520 may thus determine a next instruction to be retrieved or executed by the processor 18. In the present example, the program memory 14 may comprise a sequence of memory locations 502 to 518. An executable instruction may have been stored at each of these locations. In the example, the program counter 520 is pointing to location 508. After retrieving or executing the instruction residing at location 508, the program counter 520 may be advanced to indicate the next location, that is, location 510. In case of a jump instruction, the program counter 520 may be set to the location indicated by the jump instruction. The method may comprise reading the program counter 520 (step 302, see FIG. 3). Furthermore, the above-described step of writing one or more patch instructions to the program memory (step 206) may comprise writing the first patch instruction to the indicated location (508 in the example) or to a location (510 in the example) succeeding the indicated location. Accordingly, in step 302, the processor 18 may read the program counter 520. In subsequent step 304, the host device 10 may write the first patch instruction to a location according to the location indicated by the program counter 520. For example, the first patch instruction may be written to the indicated location 508 or to the next location 510. Thus, it may be ensured that the processor 18 will at least retrieve the first instruction when set into the run mode (step 210 in FIG. 2).

Figure 4:
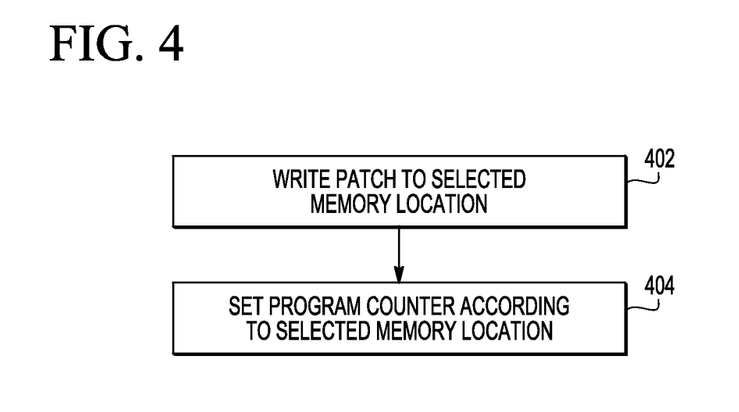
FIG. 4 schematically shows a second example of an embodiment of a method for patching a program code residing in the target.

Alternatively, now referring to FIG. 4 in conjunction with FIG. 5, the step 206 of writing patch instructions to the target device 12 may comprise writing (step 402) the first patch instruction to a selected location (for example, location 508 or 510), and the method may further comprise setting the program counter 520 according to the selected location. Accordingly, in step 402, the first patch instruction may be written to the selected memory location, e.g. to location 508. In subsequent step 404, the program counter 520 may be set according to the selected location, for example, so as to indicate the selected location or a preceding location. For example, the selected location may be location 510 and the preceding location may be location 508. In this manner, it may be ensured that the processor 18 will at least retrieve the first instruction from the program memory 14 after being set into the run mode (step 210).

Figure 6:
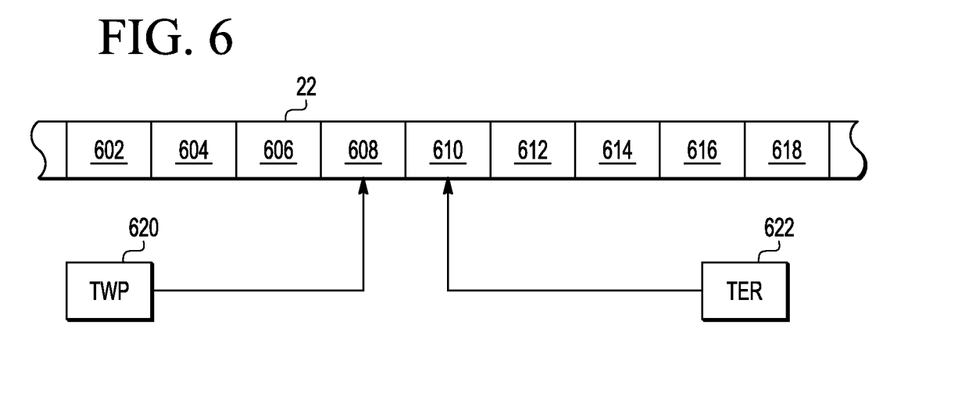
FIG. 6 schematically shows an example of an embodiment of a trace buffer, a trace write pointer (TWP) and a trace event request (TER) pointer.
Figure 7:
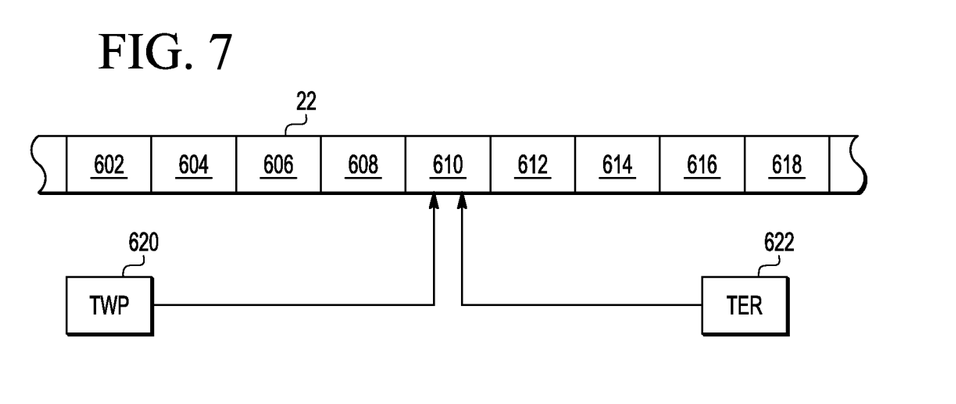
FIG. 7 schematically illustrates the example shown in FIG. 6 in another state.

Referring now to FIGS. 6 and 7, a trace event request mode of the trace unit 20 is described by way of example. The trace unit 20 may have different operating modes, for example, an overwrite mode, a run address mode, and a trace event request mode. In the overwrite mode, the trace buffer 22 may be used as a circular buffer. In the run address mode, a certain address may be selected in the trace buffer 22 and trace data may always be written to the same selected address. This may allow reading the trace data in real time by an external device. In the trace event request mode, a trace event request address, usually near the end of the buffer, may be set and the hardware may be set to trigger an event when the trace event request address is hit by the trace write pointer. The trace write pointer may indicate the current address in the buffer where new entries are to be written. The event triggered by the hardware may be a debug request or an interrupt. The trace buffer 22, as shown in an exemplary and simplified manner in FIGS. 6 and 7, may comprise a sequence of addresses 602 to 618 at which trace data can be written. In the example, the trace write pointer 620 is pointing to address 608. The trace event request address 622 may accordingly be set to the subsequent address, that is, address 610. The trace unit 20, in response to the processor 18 retrieving or executing the above-mentioned triggering instruction, may advance the trace write pointer by a defined increment, namely by the size of one trace entry. The trace write point 620 is then pointing to trace buffer address 610 (see FIG. 7). The trace write pointer 620 hitting the trace event request address 610 may prompt the trace unit 20 to generate an interrupt. The interrupt, in turn, prompts the processor 18 to execute an interrupt service routine (ISR). The ISR may comprise instructions for performing the data transfer operation.

A trace event request mode is supported by many processing architectures. Examples include the Virtual Trace Buffe (VTB) mechanism on StarCore processors, the Embedded Trace Buffer (ETB) mechanism on ARM processors, and the Nexus Trace Buffer (NTB) mechanism on StarCore and PowerPC processors. A mechanism equivalent to the TER mechanism may be provided on other architectures using Cross Triggering modules. Usually this a logic that allows to route one signal, from a block, to one or more other blocks, causing different effects on the receiver. One effect may be to halt tracing and to cause an interrupt. The PC FIFO mechanism, specific to HCS08, or the ColdFire v1 trace system provide mechanisms similar to the TER mechanism for stopping the processor when the trace buffer is filled to a certain level, e.g. when the trace buffer is full or nearly full.

Figure 8:
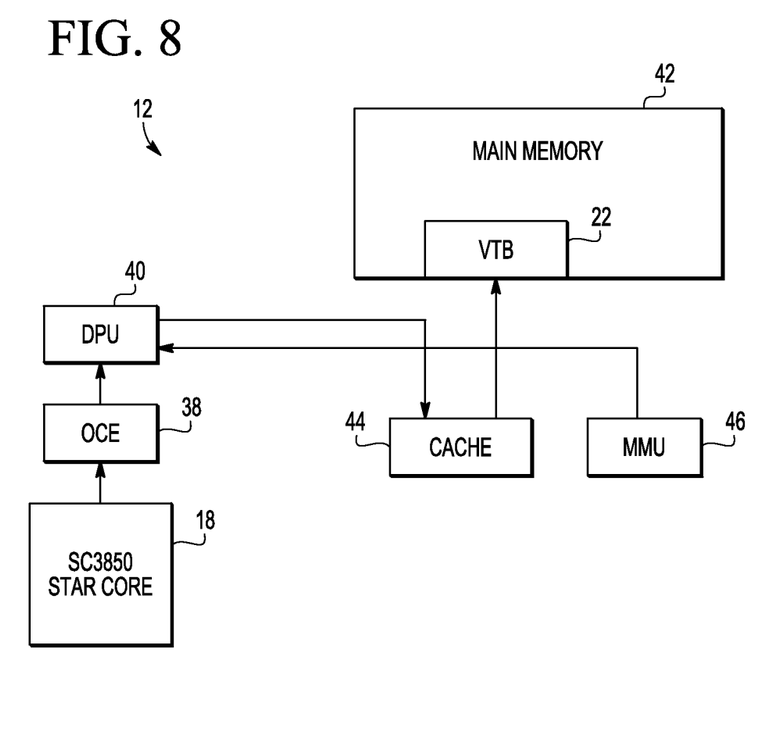
FIG. 8 schematically shows an example of an embodiment of a target.

Referring now to FIG. 8, an exemplary architecture of a target device 12 is shown in a schematic and simplified manner. In the example, the target device 12 may be a system on a chip. It comprises a digital signal processor (DSP) 18, an embedded trace unit called OCE (on chip emulator) 38, a debug and profile unite (DPU) 40, a main memory 42 comprising a virtual trace buffer (VTB) 22, a cache 44, and a memory management unit (MMU) 46. The processor 18 may have a complex architecture which may make it suitable for hardware designs in the fields of communications or networking. The OCE 38 may be arranged to collect trace data without interfering with an application that is being executed by the processor 18. The DPU 40 may be arranged to write the trace data to the VTB 22. Furthermore, the DPU 40 may add to the trace information about subsystem events, such as cache hits/hit counters, bus collisions and other useful information. The DPU 40 may also be arranged to perform task qualification for messages received from the OCE 38.

Figure 9:
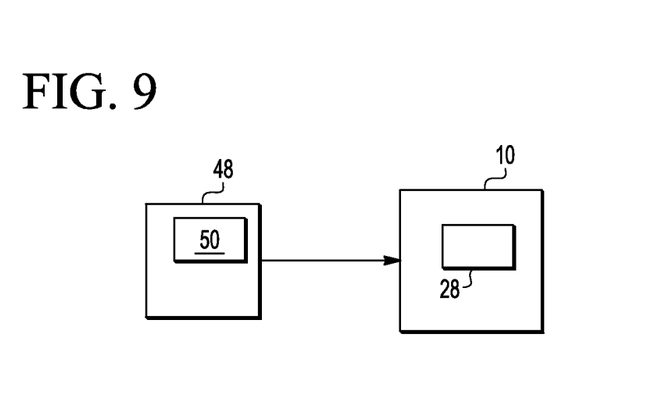
FIG. 9 schematically illustrates an example of an embodiment of a computer program product in conjunction with a host device.

FIG. 9 schematically represents a computer program product 48 for enabling a host device 10 to perform the method described above with reference to FIGS. 2 to 7. The computer program product 48 may comprise a data carrier 50, containing executable instructions and data for configuring data residing in a memory 28 of the host device 10. In particular, the host device 10 may thus be configured to enable it to write one or more patch instructions to the program memory 14 of a target device 12 as described with reference to FIG. 1. The host device 10 may, for example, be a personal computer, possibly including suitable peripheral devices.

In summary, it is proposed to prompt a target device to upload a trace to e.g. a host device. The upload may use a fast data transfer method. The proposed method may thus be faster and more reliable than JTAG. The method may be transparent to the user. The performance of JTAG, HSST and SmartDSP was compared in measurements done on an 8144ADS board running a benchmark application, using 16-byte data packets. The following data rates were measured under the same conditions: using JTAG, 1,312 packets per second (pps); using OCE (HSST), 8,000 pps, using GigaEthernet (SmartDSP HEAT), 220,000 pps.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the program 14 and the trace buffer 22 may be merged in a common memory, and the trace unit 20 and the processor 18 may be merged in a single controller.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the target device 12 may be implemented in a single integrated circuit. Alternatively, the examples may be implemented as any number of separate integrated circuits or separate devices interconnected with each other in a suitable manner. For example, the program memory 14, the processor 18, the trace unit 20, and the trace buffer 18 may implemented as separate circuits or devices.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of retrieving trace data from a target device, the target device comprising:
   a program memory,
   a processor for retrieving instructions from the program memory and executing them,
   a trace unit, and
   a trace buffer including trace data generated by the trace unit in response to the processor retrieving or executing instructions from the program memory;
   wherein the method comprises:
      writing one or more patch instructions to the program memory, the patch instructions comprising at least a first patch instruction;
      operating the processor to execute said one or more patch instructions; and
      the target device performing a data transfer operation for copying the trace data from the trace buffer to a second memory outside the target device, in response to the processor executing said patch instructions, wherein said operating the processor to execute said one or more patch instructions comprises:
         the processor retrieving or executing a triggering instruction;

the trace unit advancing a Trace Write Pointer by a defined increment in response to said retrieving or executing the triggering instruction;

the Trace Write Pointer thus hitting a Trace Event Request address of the trace buffer; and the trace unit triggering the data transfer operation in response to the Trace Write Pointer hitting the Trace Event Request address.

2. The method as set forth in claim 1, wherein the processor enters a stop mode prior to said writing.

3. The method as set forth in claim 2, wherein a debugging interface is used to read data from and write data to the target device while the processor is in the stop mode.

4. The method as set forth in claim 1, wherein the target device has a program counter indicating a current location in the program memory and the method further comprises reading the program counter;

and said writing comprises writing the first patch instruction to a location according to the indicated location.

5. The method as set forth in claim 1, wherein the target device has a program counter indicating a current location in the program memory and said writing comprises writing the first patch instruction to a selected location in the program memory;

and the method further comprises setting the program counter according to the selected location.

6. The method as set forth in claim 1, wherein triggering the data transfer operation comprises the trace unit generating an interrupt; and the processor executing an interrupt service routine in response to the interrupt, the interrupt service routine comprising instructions for performing the data transfer operation.

7. The method as set forth in claim 1, further comprising, prior to said operating, setting the trace unit into a Trace Event Request mode; and setting the Trace Event Request address according to a trace buffer address indicated by the Trace Write Pointer.

8. The method as set forth in claim 1, wherein the triggering instruction is either the first patch instruction or an instruction referenced by the first patch instruction.

9. The method as set forth in claim 1, wherein the triggering instruction is a jump to a second instruction or a call of a subroutine.

10. The method as set forth in claim 9, wherein the second instruction or the subroutine comprises a stop instruction.

11. The method as set forth in claim 1, wherein said operating comprises setting the processor into a run mode or into a single-step mode.

12. The method as set forth in claim 1, further comprising restoring original instructions in the program memory, wherein the original instructions resided in the program memory prior to the writing the one or more patch instructions to the program memory.

13. A system comprising a host device and a target device, wherein the system is arranged to perform the method as set forth in claim 1.

14. A non-transitory machine-readable storage medium for enabling a host device to perform the method as set forth in claim 1.

15. A method of retrieving trace data from a target device, the target device comprising a program memory, a processor for retrieving instructions from the program memory and executing the instructions, a trace unit, and a trace buffer including trace data generated by the trace unit in response to the processor retrieving or executing instructions from the program memory, wherein the method comprises:

writing one or more patch instructions to the program memory, the patch instructions comprising at least a first patch instruction;

operating the processor to execute said one or more patch instructions; and the target device performing a data transfer operation for copying the trace data from the trace buffer to a second memory outside the target device in response to a trace write pointer hitting a trace event request address, wherein said operating comprises:

the processor retrieving or executing a triggering instruction;

the trace unit advancing a Trace Write Pointer by a defined increment in response to said retrieving or executing the triggering instruction;

the Trace Write Pointer thus hitting a Trace Event Request address of the trace buffer; and the trace unit triggering the data transfer operation in response to the Trace Write Pointer hitting the Trace Event Request address.

16. The method as set forth in claim 15, wherein the processor enters a stop mode prior to said writing.

17. The method as set forth in claim 16, wherein a debugging interface is used to read data from and write data to the target device while the processor is in the stop mode.

18. The method as set forth in claim 15, wherein the target device has a program counter indicating a current location in the program memory and the method further comprises reading the program counter;

and said writing comprises writing the first patch instruction to a location according to the indicated location.

19. The method as set forth in claim 15, wherein the target device has a program counter indicating a current location in the program memory and said writing comprises writing the first patch instruction to a selected location in the program memory;

and the method further comprises setting the program counter according to the selected location.

* * * * *